United States Patent [19]

Vyvoda et al.

[11] Patent Number: 5,021,490
[45] Date of Patent: Jun. 4, 1991

[54] INTERNALLY PLASTICIZED POLYVINYL HALIDE COMPOSITIONS AND ARTICLES PREPARED THEREFROM

[75] Inventors: Josef C. Vyvoda, Avon Lake, Ohio; James T. Harvilchuck, Orland Park, Ill.

[73] Assignee: The B. F. Goodrich Company, Akron, Ohio

[21] Appl. No.: 389,031

[22] Filed: Aug. 3, 1989

[51] Int. Cl.⁵ .......................... C08K 5/52; C08F 20/00
[52] U.S. Cl. .................... 524/140; 524/143; 524/297; 524/313; 524/320; 526/297; 526/303.1; 526/312; 526/316; 526/318.25; 526/318.5; 526/320; 526/321; 526/323.2; 526/329.4
[58] Field of Search ............... 526/321, 343, 345, 316, 526/297, 303.1, 312, 318.25, 318.5, 320, 323.2, 329.4; 524/558, 569, 140, 143, 297, 313, 320

[56] References Cited

U.S. PATENT DOCUMENTS

| | | | |
|---|---|---|---|
| 2,985,615 | 5/1961 | Tunteler | 525/419 |
| 3,074,905 | 1/1963 | Douglas | 524/291 |
| 3,227,735 | 1/1966 | De Witt et al. | 526/321 |
| 3,250,802 | 5/1966 | Verdol | 526/321 |
| 3,260,705 | 7/1966 | Slocombe et al. | 526/345 |
| 3,855,160 | 12/1974 | Shiotsu et al. | 428/305.5 |
| 4,260,541 | 4/1981 | Kolinsky et al. | 524/567 |
| 4,402,887 | 9/1983 | Kuriyama et al. | 264/22 |
| 4,478,961 | 10/1984 | Tanaka et al. | 523/105 |
| 4,806,590 | 2/1989 | Padget et al. | 526/343 |

Primary Examiner—Joseph L. Schofer
Assistant Examiner—R. H. Delmendo
Attorney, Agent, or Firm—Thoburn T. Dunlap

[57] ABSTRACT

An internally plasticized polyvinyl halide composition is prepared by polymerizing a vinyl halide in the presence of a reactive polyester plasticizer having terminal groups copolymerizable therewith. The reactive polyester acts as an internal plasticizer for the polyvinyl halide composition and is not readily extactable therefrom.

13 Claims, No Drawings

INTERNALLY PLASTICIZED POLYVINYL HALIDE COMPOSITIONS AND ARTICLES PREPARED THEREFROM

TECHNICAL FIELD

This invention relates to internally plasticized polyvinyl halide compositions. More specifically, this invention relates to polyvinyl chloride compositions internally plasticized by copolymerizing vinyl chloride with a reactive polyester plasticizer, and relates to articles prepared therefrom having low rates of plasticizer migration.

STATE OF THE ART

Polyvinyl halide polymers and particularly polyvinyl chloride (PVC) polymers have enjoyed a great deal of commercial success as materials that can form useful articles. The ease of molding, extruding, calendaring, or forming PVC as well as its low cost has contributed to this success.

PVC by itself is a tough and hard polymer. Therefore, to facilitate the processing of PVC into useful articles, PVC is often plasticized with materials that make the polymer softer and more flowable. The plasticizers are normally low molecular weight materials, like dioctyl phthalate (DOP), the most widely used PVC plasticizer.

These low molecular weight plasticizers are usually incorporated into the PVC during a compounding operation. In the compounding operation, DOP plasticizer is dry blended into the PVC resin and the resin is melt processed to achieve a plasticized polymer composition. PVC compositions including these low molecular weight plasticizers perform very well in most applications. However, the low molecular weight plasticizers have a tendency to migrate out of the composition over extended periods of time. This migrating phenomena eventually produces unsatisfactory physical properties in some products. For example, the PVC becomes more brittle as the plasticizer migrates out of the PVC composition, thus leading to cracking and loss of flexibility of the PVC product. Also in certain medical and food applications such as blood bags, I.V. bags, tubing, food wrap and beverage containers, the low molecular weight plasticizer can be extracted by the contents of the PVC container.

Investigators have partially solved these problems by plasticizing polyvinyl halides with compounds that react with and chemically bond to the polyvinyl halide backbone. Douglas, in U.S. Pat. No. 3,074,905 discloses a reactive vinyl chloride copolymer resin that is plasticized with a reactive acrylate ester compound. However, in the method of Douglas, first the reactive polyvinyl halide copolymer is made, then the reactive acrylate ester plasticizer is reacted onto the copolymer backbone in a milling process.

Kolinsky et al, in U.S. Pat. No. 4,260,541 disclose a method for internally plasticizing PVC by polymerizing vinyl chloride in the presence of a polymeric plasticizer prepared by the polyesterification of dicarboxylic acids and diols. However, isopropyl alcohol extraction studies indicate that up to 82 percent of the polyester is readily extracted from the resin composition, indicating that only a small portion of the plasticizer is covalently bound to the PVC.

In view of the shortcomings of the prior art, it would be desirable to have an internally plasticized vinyl halide composition comprising a non-migrating plasticizer. It also would be desirable to provide a plasticizer for internally plasticizing a polyvinyl halide such that the internally plasticized polyvinyl halide has low plasticizer extractability, demonstrates excellent plasticizing effect and is low in toxicity. In addition, a need exists for a reactive plasticizer that is sufficiently stable to resist autopolymerization in storage, but that is sufficiently reactive to copolymerize with a vinyl halide to form an internally plasticized polyvinyl halide resin.

SUMMARY OF THE INVENTION

Accordingly, it is an object of the present invention to provide an internally plasticized vinyl halide that demonstrates low plasticizer migration and low plasticizer extractability characteristics, wherein a reactive polyester is used as an internal plasticizer.

Another object of this invention is to provide a reactive polyester plasticizer that is stable for extended periods under normal storage conditions.

A further object of this invention is to provide an internally plasticized polyvinyl halide that is useful in medical applications, particularly as blood transmitting tubing and connectors therefor, blood handling devices, blood bags, I.V. bags and I.V. tubing.

A still further object of this invention is to provide an internally plasticized vinyl halide composition useful as packaging for foodstuffs.

These and other objects and advantages of this invention are accomplished herein by the vinyl halide composition of the present invention comprising up to about 50 percent by weight of a reactive polyester plasticizer.

DETAILED DESCRIPTION

The term reactive plasticizer as used herein refers to reactive polyesters containing at least one chain terminator including functional groups that are copolymerizable with vinyl halide monomer. The reactive plasticizer therefore is covalently incorporated into the backbone of the resin and is less prone to migration from the resin than externally plasticized resins wherein the plasticizer merely is entrapped within the resin matrix. The reactive polyester plasticizers of the present invention used to internally plasticize polyvinyl halide resins are expressed by the general structural formula (I):

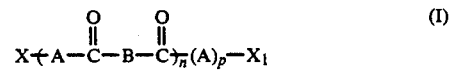

wherein A is a linear or branched polyol residue having from about 2 to 10 carbon atoms and one oxy group at each of its molecular ends, such as $-O-CH_2CH_2-O-$; B is linear alkylene from about 2 to 12 carbon atoms, such as $-CH_2CH_2CH_2-$, or B is phenylene; X and $X_1$ independently represent hydrogen, acyl groups derived from saturated and monounsaturated monocarboxylic acids having from about 3 to 18 carbon atoms, or residues of hydroxyalkyl esters or isocyanates of the formula $R-C(0)-O-Y$, wherein R is a hydrocarbon, either saturated or unsaturated, and including from about 3 to about 18 carbon atoms, and wherein either Y is a linear alkylene from 1 to about 4 carbon atoms or Y is the amido group $-(CH_2)_zNHC(O)-$ wherein Z is an integer from 1 to 4; n is an integer 1 to 60; and P is 0 or 1; with the proviso that when p is 0, $X_1$ is hydrogen; and at least one of X or $X_1$ must contain ethylenic monounsaturation. Further, it is apparent to those skilled in the art that when B is phenylene, then the relative positions of the carbonyl groups on the aromatic ring as represented in structural formula (I) above can be in the ortho, meta or para positions, such as, for example, when the phenylene group taken together with the carbonyl carbons represents orthophthalic, metaphthalic or terephthalic acid residues.

The reactive polyester plasticizers are synthesized by reacting a dibasic carboxylic and/or a dibasic carboxylic acid anhydride, a polyol, and a chain terminator under polyesterification conditions, wherein a polyester promoting catalyst and/or polymerization inhibitor is optionally included.

Suitable dibasic carboxylic acids, or the corresponding anhydrides, are linear acids that typically contain from about 4 to about 14 carbon atoms. Preferred dibasic carboxylic acids include, for example, glutaric acid, adipic acid, pimelic acid, succinic acid, succinic anhydride, sebacic acid, azelaic acid, dodecanedioic acid, suberic acid, isophthalic acid, orthophthalic acid, orthophthalic anhydride, terephthalic acid, and similar dibasic acids; or mixtures thereof. Suitable polyols include glycols, triols, higher polyols and similar hydroxyl-containing compounds; or mixtures thereof. Typical glycols are branched or linear glycols and include from 2 to about 10 carbon atoms. Suitable glycols include, for example, ethylene glycol; 1,2-propylene glycol; 1,3-propane diol; 1,4-butane diol; 2,2-dimethyl-1,3-propane diol; 1,3-butane diol; 1,6-hexane diol; 1,10-decane diol; diethylene glycol; triethylene glycol; dipropylene glycol; tripropylene glycol; glycerol; neopentyl glycol; trimethylolpropane; and similar diols and polyols; or mixtures thereof.

The chain terminator of choice is a hydroxyalkyl ester or a monobasic carboxylic acid, or mixtures thereof. However, at least 50 percent of the chain terminator must be a chain terminator having an olefinic functionality copolymerizable with a vinyl halide. In accordance with an important feature of the present invention, at least one of the two chain terminating groups, and more preferably both terminating groups of the reactive polyester plasticizers of the present invention, as represented by X and $X_1$ in formula (I), must contain olefinic unsaturation. The olefinic group provides the chemical functionality that allows copolymerization with the vinyl halide. To achieve the full advantage of the present invention, the unsaturated chain terminators are monounsaturated compounds including one olefinic functionality.

Suitable chain terminating monobasic carboxylic acids include monobasic carboxylic acids containing from about 3 to about 18 carbon atoms including, for example, but not limited to, acrylic acid, acrylic acid anhydride, methacrylic acid, methacrylic acid anhydride, crotonic acid, 2-ethylhexoic acid, saturated and unsaturated fatty acids derived from natural animal and vegetable sources, such as coconut oil fatty acids or tallow fatty acids, like $C_6$ to $C_{18}$ fatty acids derived from the hydrolysis of coconut oil or tallow; or mixtures thereof.

Suitable chain terminating hydroxyalkyl esters include, for example, hydroxyethyl crotonate, hydroxypropyl crotonate, hydroxyethyl methacrylate, hydroxyethyl acrylate, hydroxypropyl methacrylate, hydroxypropyl acrylate and similar hydroxyalkyl esters; or mixtures thereof. Hydroxyethyl methacrylate is available commercially under the trade name ROCRYL 400 from Rohm and Haas Co., Philadelphia, Pa.

In addition to the chain terminators described above, the use of reaction products of suitable monobasic carboxylic acids, such as crotonic acid, and the other compounds such as alcohols or polyols, also are acceptable. Examples of such products include esters such as neopentyl glycol dicrotonate, propylene glycol dicrotonate, hexanediol diacrylate, and similar esters, or mixtures thereof made from crotonic acid and polyols and/or alcohols. Compounds of structural formula I are especially useful when terminated with crotonic acid or a crotonic acid derivative because compounds of structural formula I derived from crotonic acid maintain sufficient reactivity to copolymerize with a vinyl halide yet are extremely stable both under normal storage conditions and the esterificiation conditions encountered during reactive polyester plasticizer manufacture. The especially preferred crotonic acid-containing terminators are crotonic acid, neopentyl glycol dicrotonate and propylene glycol dicrotonate.

As stated previously, the reactive polyester plasticizers are prepared by reacting, with stirring, the diol, the dibasic carboxylic acid and the chain terminator at a temperature ranging from about 150° to about 230° C. in an esterification apparatus. Optionally, an appropriate esterification catalyst can be included in the esterification reaction mixture. Suitable catalysts include, for example, zinc acetate, zinc oxide, stannous oxalate, dibutyl tin oxide and the like. The catalysts generally are present in an amount of from about 0.005 to about 0.5 percent by weight of the esterification reaction mixture. The esterification reaction preferably is performed by heating the esterification reaction mixture for a time adequate to produce a reactive polyester plasticizer of formula (I) having an acid number of less than 10, preferably less than 3, and to achieve that full advantage of the present invention, less than about 1.5. In addition, the proportions of dibasic carboxylic acid, diol and chain terminator are selected such that the reactive polyester plasticizer generally has a molecular weight ranging from about 500 to about 8000 number average molecular weight.

The diol and the dibasic carboxylic acid ingredients are present in the esterification reaction mixture in a ratio of stoichiometric amounts ranging from 1 to 1 to 2 to 1, whereas the chain terminator is included in a molar amount of from about 1 to about 40 percent of the combined molar amounts of the diol and the dibasic carboxylic acid components. If an ethylenically difunctional reactive polyester plasticizer is desired, then a substantial excess molar amount, such as up to 20 percent of the esterification reaction mixture, of a suitable chain terminator is employed.

In the preparation of the internally plasticized polyvinyl halide compositions of the present invention, vinyl halide monomer is polymerized in the presence of the reactive polyester plasticizer in an amount of up to 50 parts by weight reactive polyester for each 100 parts by weight of the vinyl halide monomer. The amount of the reactive polyester plasticizer added to the vinyl halide monomer is not particularly critical as long as the reactive polyester plasticizer is present in an amount to effect the plasticization of the vinyl halide composition. For example, levels of from about 10 to about 30 percent by weight of the total plasticized vinyl halide composition give soft flexible materials which need no further plasticization to function as sheets, blood bags, tubing and the like. In order to obtain a sufficiently flexible film, the polyester plasticizer is preferably present in an amount of at least 30 percent by weight of the total plasticized vinyl halide composition.

The reactive polyesters described hereinabove can be added to the polymerization reactor containing demineralized water. The reactor is closed and evacuated of oxygen and the vinyl chloride monomer is charged for subsequent reaction. Preferably, the reactive polyester plasticizer can be premixed with vinyl halide monomer before charging into the polymerization reactor. The premixed vinyl halide monomer/reactive polyester plasticizer admixture also can be metered into the polymerization reactor. The polymerizable admixture of the vinyl halide and reactive polyester plasticizer can be polymerized via suspension, mass, or emulsion processes: however suspension polymerization is preferred.

In accordance with the present invention, one or more other polymerizable monomers can be added to the polymerizable vinyl halide and reactive polyester plasticizer mixture. For example, other vinyl halides and vinylidene halides such as vinyl bromide, vinyl fluoride, vinylidene fluoride and vinylidene chloride can be added. In addition, other polymerizable olefinic monomers having at least one terminal $CH_2=C<$ grouping can be added. For example, such olefinic monomers include $\alpha,\beta$-olefinically unsaturated carboxylic acids, such as acrylic acid, methacrylic acid, ethacrylic acid, $\alpha$-cyanoacrylic acid, and similar acids; esters of acrylic acid, such as methyl acrylate, ethyl acrylate, butyl acrylate, octyl acrylate, 2-ethylhexyl acrylate, cyanoethyl acrylate, and similar esters; esters of methacrylic acid, such as methyl methacrylate, butyl methacrylate, and similar esters; ethylenically unsaturated dicarboxylic acids, their corresponding anhydrides and their corresponding $C_1$-$C_{20}$ monoalkyl and dialkyl esters such as aconitic acid, fumaric acid, maleic acid, itaconic acid, citraconic acid, maleic anhydride, dibutyl fumarate and monoethyl maleate; ethylenically unsaturated nitriles, such as acrylonitrile, methacrylonitrile, and the like; ethylenically unsaturated amides such as acrylamides, like methyl acrylamide, N-methylol acrylamide, N-butyoxy methacrylamide, and the like; vinyl ethers, such as ethyl vinyl ether, chloroethyl vinyl ether, and the like; vinyl ketones such as methyl vinyl ketone; aromatic olefins, like styrene and styrene derivatives, such as $\alpha$-methyl styrene, vinyl toluene, chlorostyrene, vinyl naphthalene, and the like; allyl and vinyl chloroacetate, vinyl acetate; vinyl pyridine, diolefins, including butadiene, isoprene, chloroprene, and the like; and other polymerizable olefinic monomers known to those skilled in the art.

The level of polymerizable comonomer should be no greater than about 50%, preferably 20% by weight, based on the weight of the monomer mixture including the vinyl halide, the reactive polyester plasticizer and any optional polymerizable comonomers. However, to achieve the full advantage of the present invention, the vinyl halide monomer is copolymerized only with the reactive polyester plasticizer and not with any other copolymerizable monomer. The preferred embodiment of the present invention therefore includes only a vinyl halide monomer, such as vinyl chloride monomer, and the reactive polyester plasticizer as polymerizable components present in the reaction mixture.

The invention will be described for simplicity and convenience in terms of a suspension polymerization process, it being understood that this is merely intended in an illustrative sense and not limitative. The resins of this invention could be produced by the emulsion process or the mass process.

The suspension polymerization process of the invention uses free radial catalysts or initiators. Among the catalysts or initiators that may be employed in the present process are the free radical yielding catalysts or initiators, such as the alkanoyl, aroyl, alkaroyl and aralkanoyl diperoxides and monohydroperoxides, azo compounds, peroxyesters, percarbonates, and the like. Examples of such catalysts include benzoyl diperoxide, lauryl diperoxide, diacetyl peroxide, cumene hydroperoxide, hydrogen peroxide, methyl ethyl ketone peroxide, diisopropylbenzene hydroperoxide, 2,4-dichlorobenzoyl peroxide, benzoyl peroxide, naphthoyl peroxide, lauroyl peroxide, acetyl cyclohexane sulfonyl peroxide, t-butyl perbenzoate, di-t-butyl perpivalate, diisopropyl peroxydicarbonate, di(sec-butyl) peroxydicarbonate, azo-bisisobutyronitrile, $\alpha,\alpha'$-azodi-isobutyrate, or combinations thereof. Found useful are lauroyl peroxide, di(2-ethyl hexyl) peroxydi-carbonate, di-ethyl peroxydicarbonate, di(n-propyl) peroxydicarbonate, diisopropyl peroxydicarbonate, di(sec-butyl) peroxydicarbonate (SBP) and acetyl cyclohexane sulfonyl peroxide. The choice of any particular free radical yielding catalyst is dictated in part by the particular monomer or monomers to be polymerized, the chosen reaction temperature and by the color requirements of the polymer or copolymer to be produced. Further, more than one catalyst may be employed in the monomer mixture. Usually, the amount of catalyst or catalysts employed will be in the range of about 0.005 percent to about 1 percent by weight, based on the weight of the monomer mixture being polymerized. Preferably, the amount of catalyst(s) will be in the range of about 0.02 percent to about 0.10 percent by weight of the monomer mixture.

When polymerizing olefinic monomers by the suspension polymerization process, it is advantageous to add to the liquid reaction medium a small amount of a dispersant. The purpose of the dispersant is to obtain a more complete and uniform dispersal of the monomers and catalyst(s) throughout the reaction medium prior to and during the polymerization of the monomers. Any of the well known dispersants operative in aqueous media may be employed. These include, among others, methyl cellulose, methoxy cellulose, hydroxypropyl methyl cellulose, polyvinyl alcohol, dodecylamine hydrochloride, sodium lauryl sulfonate, lauryl alcohol, sorbitan monolaurate polyoxyethylene, nonylphenoxy polyoxyethylene ethanol, hydrolyzed polyvinyl acetates, polyacrylic acid polymers, polyethylene oxide containing surfactants and non-polyethylene oxide containing surfactants, etc. The amount of dispersant employed will be in the range of about 0.01 percent to about 1.0 percent by weight, based on the weight of the monomer mixture. Preferably, however, the dispersant is employed in the range of about 0.02 percent to about 0.15 percent by weight of the monomer mixture.

In aqueous suspension polymerization the reaction is usually conducted at a temperature in the range of about 0° C. to about 80° C. depending upon the particular monomer or monomers being polymerized. It is preferred, however, to employ temperatures in the range of about 40° C. to about 70° C., since polymers produced at these temperatures have the most useful physical properties. The time of the reaction will vary from about 2 to about 15 hours.

The suspension polymerization process can be carried out at conventional pressures utilized in the polymerization of vinyl chloride monomer.

The suspension polymerization process of this invention is carried out in an aqueous medium. It is preferred that the aqueous medium be agitated rapidly during the entire polymerization reaction period. Demineralized water is the preferred medium. The ratio of monomers to water is from about to 1 to about 1 to 10 by weight. Preferably a ratio of about 1 to 1 to about 1 to 4 is used.

In addition to the reactive polyester plasticizer, that is copolymerized into vinyl halide polymer backbone to act as a covalently bound internal plasticizer for the polyvinyl halide resin, one or more other external plasticizers that do not copolymerize into the vinyl halide polymer backbone can be added to the polymerization mixture. For example, expoxidized oils such as expoxidized soybean oil (ESO) and expoxidized linseed oil (ELO) can be added advantageously into the polymerization medium to physically entangle with the internally plasticized vinyl halide copolymer to impart additional plasticizing properties to the resins of he present invention. The vinyl halide and reactive polyester plasticizer components are polymerized in the presence of ESO or ELO to give a vinyl halide copolymer internally plasticized with the reactive polyester plasticizer and externally plasticized with the ESO or ELO. The amount of epoxidized oil utilized ranges from about 1 to 15 parts by weight per 100 parts by weight of vinyl halide monomer.

Other external plasticizers, which may be added, include those well known in the art, for example, the phthalates like di-2-ethylhexyl phthalate, diisoctyl phthalate, dicapryl phthalate, di-2-ethylhexyl isophthalate, di-2-ethylhexyl terephthalate, di-n-butyl phthalate, di-n-octyl-n-decyl phthalate, diisodecyl phthalate, ditridecyl phthalate, and butyl benzyl phthalate. Other epoxides also can be used as external plasticizers besides the epoxidized oils, such as 2-ethylhexyl epoxytallate, isodecyl epoxytallate, and tetrahydro-4,5,-epoxyphthalate. In addition, aliphatic diesters, also can be used as external plasticizers such as 2-ethylhexyl adipate, n-octyl-n-decyl adipate, diisodecyl adipate, di-2-ethylhexyl azelate, and dibutyl sebacate. The external plasticizer also can be a phosphate such as tri-2-ethylhexyl phosphate, octyl diphenyl phosphate, cresyl diphenyl phosphate, and tricresyl phosphate. Other classes of external plasticizers that can be used include phthalic anhydride derivatives, polyesters, trimellitates and citrates.

The novel internally-plasticized polyvinyl halide product of the present invention is a solid resin. The preferred resin is a composition comprising a PVC copolymer internally plasticized by covalently binding a reactive polyester plasticzer into the PVC copolymer backbone. The resin product is an internally plasticized polyvinyl chloride copolymer, wherein the major portion of the internal plasticizer is not extractable from and does not migrate from the polyvinyl chloride resin composition. The extraction of the internal plasticizer is performed by a Soxhlet extraction method with a suitable solvent such as isopropyl alcohol. Surprisingly and unexpectedly, it has been found in the best embodiment that less than about 20 percent by weight of the amount of reactive polyester plasticizer of structural formula (I) added to the monomer mix is extracted from the internally-plasticized polyvinyl halide copolymer. Generally, the amount of extractable reactive polyester plasticizer of formula (I) is less then about 50 percent of the weight of the reactive polyester plasticizer present in the monomer polymerization mixture.

The internally-plasticized resin composition has several advantages by being in the form of solid particles. For example, the resin can be stored and shipped in solid form, and easily conveyed to calendars, extruders and other processing equipment to be formed into finished products. In addition, the internally-plasticized resin can be compounded further with powder compounding techniques. The particle size of the resin can be varied depending upon the process used to make the resin. However, the particle size of the resin normally ranges from sub-micron size to about 1000 microns, and preferably the resin particles are from about 70 microns to about 400 microns in size.

Other conventional compounding ingredients can be added to the internally plasticized resin particles, such as stabilizers, lubricants, coloring agents, fillers and the like. In addition, although the internally plasticized resin can be produced by the above described process such that further plasticization is not necessary, additional plasticizers can be added if desired.

Articles made from the resins of this invention are a more permanently plasticized than articles made from conventional externally plasticized resins. The minor portion of the reactive polyester plasticizer that has not copolymerized with the vinyl halide will migrate from the article slowly because of its entanglement with internally plasticized PVC molecules. This physical entanglement results from the polymerization of the PVC in the presence of the reactive polyester plasticizer. The major portion of the reactive polyester plasticizer which is copolymerized into the polyvinyl halide backbone will not migrate out, or be extracted from an article made from a resin that is internally plasticized with a reactive polyester plasticizer of formula (I).

The following examples will demonstrate to one skilled in the art how to operate within the scope of the present invention and are not intended to serve as a limitaton on the scope of this invention, for such scope is defined only in the claims.

It should be understood that in the following examples, and elsewhere in the present specification and claims, all percentages and all parts are intended to express percent by weight and parts by weight unless otherwise clearly indicated.

In referring to the ingredients comprising the reactive polyester plasticizers of the present invention the following designations are used as follows:

AA (adipic acid)
CA (crotonic acid)
CFA (coconut fatty acid)
DBE-2 (disbasic ester)
DDDA (dodecanedioic acid)
MA (methacrylic acid)
MDI (diphenylmethane-4,4'-diisocyanate)
NPG (neopentyl glycol)
PA (phthalic anhydride)
PG (propylene glycol)
SA (sebacic acid)
TMP (trimethylolpropane)
TP (terephthalic acid)

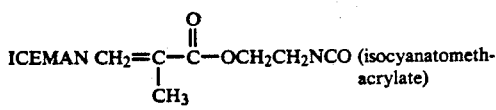
ICEMAN CH₂=C(CH₃)—C(=O)—OCH₂CH₂NCO (isocyanatomethacrylate)

EXAMPLE 1

A reactive polyester plasticizer of formula (I) was prepared from a mixture comprising sebacic acid (SA), propylene glycol (PG) and crotonic acid (CA) in the following manner: 678.4 grams (3.36 moles) of sebacic acid along with 287.2 grams (3.77 moles) of propylene glycol and 34.4 grams (0.40 moles) of crotonic acid were charged to a reaction vessel. The resulting mixture was agitated then was heated under a nitrogen blanket to a temperature of 290° F. wherein the esterification reaction began. The reaction temperature was increased steadily up to about 410° F. while maintaining the overhead temperature between about 210° and about 215° F. The acid value, hydroxyl value and color were monitored, and upon attaining an acid value of below 10, a partial vacuum was applied to the reaction mixture. As the amount of distillate slowed, a full vacuum of approximately 10 to 20 mm Hg was applied to the reaction mixture and maintained until the desired acid value, hydroxyl value and viscosity of the reaction mixture were achieved. The reaction vessel was then cooled and the reactive polyester plasticizer was filtered and discharged.

EXAMPLE 2

A reactive polyester plasticizer of formula (I) was prepared from a mixture comprising adipic acid (AA), neopentyl glycol (NPG) and crotonic acid (CA) in a method similar to the method explained in Example 1, wherein 586.5 grams (4.03 moles) of adipic acid were charged to the reaction vessel in addition to 470.4 grams (3.98 moles) of neopentyl glycol and 3.1 grams (0.50 moles) of crotonic acid. Upon completion of the esterification reaction, the ingredients in the reaction vessel were cooled to 150° F. Water was added in an amount of 10 percent of the volume of the reaction mixture and hydrogen peroxide was added in an amount of 0.05 percent of the volume of the reaction mixture. The contents then were agitated and finally allowed to settle. The water layer was decanted then the remaining reaction mixture was dried at 250° F. and full vacuum. The resulting reactive polyester plasticizer was then cooled and filtered.

EXAMPLE 3

In accordance with another feature of the present invention, the following example illustrates the preparation of a reactive polyester plasticizer including more than one dibasic carboxylic acid and more than one polyol, and that is terminated at each molecular end with crotonic acid.

A reactive polyester plasticizer was prepared from sebacic acid (SA), adipic acid (AA), propylene glycol (PG), neopentyl glycol (NPG) and crotonic acid (CA) in the following manner: 339.4 grams (1.68 moles) of sebacic acid, and 245.3 grams (1.68 moles) of adipic acid, along with 143.8 grams (1.89 moles) of propylene glycol, 195.5 grams (1.88 moles) of neopentyl glycol, and 34.4 grams (0.40 moles) of crotonic acid were added to a reaction vessel. The resulting mixture was agitated then was heated under a nitrogen blanket to a temperature of about 290° F. wherein the esterification reaction began. The reaction temperature was increased steadily up to 410° F. while maintaining the overhead temperature between about 210° F. and about 215° F. The acid value, hydroxyl value and color of the reaction mixture were monitored, and upon attaining an acid value of below 10, a partial vacuum was applied to the reaction. As the distillate slowed, a full vacuum of approximately 10 to 20 mm Hg was applied and maintained until the desired acid value, hydroxyl value and viscosity of the reaction mixture were achieved. The reaction vessel then was cooled and the reactive polyester plasticizer was filtered and discharged.

EXAMPLES 4–18

The following reactive polyester plasticizers also were prepared as set forth in the method of Examples 1 through 3.

| Example No. | Composition | Viscosity* (CPS at 25° C.) |
|---|---|---|
| 1 | SA/PG/CA | 182,000 |
| 2 | AA/NPG/CA | 10,600 |
| 3 | AA/SA/NPG/PG/CA | 71,000 |
| 4 | AA/PG/ICEMAN | 1,470 |
| 5 | AA/PG/CA | 3,200 |
| 6 | AA/PG/CA | 11,200 |
| 7 | AA/PG/CA | 43,300 |
| 8 | AA/PA/PG/CA | 190,000 |
| 9 | AA/PG/CFA/CA | 825 |
| 10 | DBE-2/PG/CA | 1,650 |
| 11 | AA/PG/CA | 800 |
| 12 | AA/TP/PG/CA | |
| 13 | AA/PG/CFA/MA | |
| 14 | SA/NPG/CFA/CA | 4,000 |
| 15 | DDDA/NPG/CFA/CA | 4,500 |
| 16 | DDDA/NPG/CA | 150,000 |
| 17 | AA/NPG/CA | 98,000 |
| 18 | SA/NPG/CA | 90,000 |

The above examples demonstrate the variety of reactive polyester plasticizers that can be synthesized and the number average molecular weight ranges that are available. The viscosity values determined at 25° C. serves as a general indication of the number average molecular weight of the resin. For example, the resin of Example 8 has a viscosity of 190,000 cps at 25° C. that is indicative of a number average molecular weight of approximately 8000, whereas the 800 cps viscosity of the resin of Example 11 is indicative of a low number average molecular weight reactive polyester plasticizer of about 500. In the above examples, a three component system, such as Example 4, referes to a reactive polyester plasticizer comprising a condensation product of adipic acid and propylene glycol terminated at both ends with ICEMAN. Accordingly, a four component system, such as AA/PG/CFA/CA in Example 9, refers to the condensation product of propylene glycol and adipic acid terminted with coconut fatty acid and crotonic acid.

EXAMPLES 19–23

The following examples illustrate the preparation of the internally plasticized vinyl chloride copolymers of the present invention via aqueous suspension polymerization. The polymerization reactions were conducted in a reactor equipped with a temperature control and an agitation means. A vinyl chloride/reactive polyester plasticizer premixture was charged to a 3L polymerization reactor that also contained demineralized water and dispersants. Following the charging of the vinyl chloride/reactive polyester plasticizer premixture, a polymerization initiator was added to the reactor. The polymerization was conducted with agitation at 700 RPM at a temperature of 55° C. During the course of the reaction, additional demineralized injection water was charged to the reactor. The reaction was allowed to proceed until a pressure drop occurred at which time the reaction was stopped. The resulting resin was then stripped of residual monomer and dried. The polymerization recipes are set forth in TABLE 1.

EXAMPLES 28-36

The following examples are presented to show that the reactive polyester plasticizers are copolymerized with the vinyl chloride and therefore incorporated into the vinyl chloride backbone to provide an internally plasticized polyvinyl chloride resin wherein the internal plasticizer resists migration and extraction from the resin.

About 60 g of the internally plasticized polyvinyl chloride resin was placed in an extraction thimble that

TABLE I

| | Parts by Weight | | | | |
|---|---|---|---|---|---|
| | Examples | | | | |
| Ingredient | 19 | 20 | 21 | 22 | 23 |
| Water (demineralized) | 188 | 188 | 188 | 188 | 188 |
| Vinyl Chloride Monomer (VCM) | 65 | 65 | 70 | 70 | 70 |
| Reactive Polyester Plasticizer (RPE) | 35 | 35 | 30 | 30 | 30 |
| Dispersant[1] | 0.08 | 0.08 | 0.08 | — | — |
| Dispersant[2] | 0.04 | 0.04 | 0.04 | 0.08 | 0.08 |
| Dispersant[3] | — | — | — | .035 | .035 |
| Initiator[4] | 0.038 | 0.038 | .038 | .038 | .038 |
| VCM conversion (%) | 77.9 | 78.9 | 92.4 | 81.8 | 71.2 |
| RPE type | SA/PG/CA | AA/PG/CFA/CA | AA/NPG/CA | AA/PG/CA | AA/PG/CA |
| RPE level (phr) | 69.8 | 70.0 | 47.0 | 52.9 | 60.2 |
| RPE level in final product[5] | 41.1 | 41.2 | 32.0 | 34.6 | 37.6 |

[1] polyvinyl acetate (70–72% hydrolyzed)
[2] methoxy cellulose
[3] polyvinyl acetate (99% hydrolyzed)
[4] SBP
[5] Wt. % based on total copolymer weight.

EXAMPLES 24-27

The following examples illustrate the preparation of internally plasticized polymers utilizing epoxidized oils as additional plasticizing aids.

The plasticized polymers of the following examples were polymerized following the procedures and conditions set forth in Examples 19-23 except that the reactor size was 55L and the agitation was conducted at 450 RPM. The vinyl chloride monomer/reactive polyester plasticizer/epoxidized oil components were premixed before charging into the reactor. The polymerization recipes are set forth in TABLE II.

was then inserted into a Soxhlet extraction apparatus. The extraction was carried out with isopropyl alcohol (IPA) at a temperature just below the boiling point of IPA (82.4° C.) for 24 hours. After the extraction was completed, the internally plasticized resin was dried in a vacuum oven to constant weight. The IPA extraction solvent containing any extractable plasticizer was stripped away on a Rotovap evaporator. The plasticizer residue was then dried in a vacuum oven to constant weight.

The amount of extracted plasticizer was calculated from the weight loss of the polyvinyl chloride resin and the amount of extracted plasticizer. The extraction results are given in TABLE III.

TABLE II

| | Parts by Weight | | | |
|---|---|---|---|---|
| | Examples | | | |
| Ingredient | 24 | 25 | 26 | 27 |
| Water (demineralized) | 188 | 188 | 190 | 190 |
| Vinyl Chloride Monomer (VCM) | 75 | 75 | 75 | 75 |
| Reactive Polyester (RPE) | 25 | 12.5 | 15 | 15 |
| Expoxidized Oil | 10 | 12.5 | 10 | 10 |
| Dispersant[1] | 0.1 | .120 | 0.08 | 0.08 |
| Dispersant[2] | 0.06 | 0.06 | 0.04 | 0.04 |
| Dispersant[3] | 0.02 | 0.02 | 0.01 | 0.04 |
| Dispersant[4] | — | 0.06 | 0.02 | 0.02 |
| Initiator | 0.033 | 0.042 | 0.05 | 0.042 |
| VCM conversion (%) | 56.9 | 65.6 | 58.9 | 77.4 |
| RPE type | SA/PG/CA | AA/PG/CFA/CA | SA/RG/BA | SA/NPG/CFA/CA |
| Epoxidized Oil Type (Level)[5] | ELO (12.9) | ELO (16.8) | ELO (14.6) | ELO (12.0) |
| RPE level in final product | 32.2 | 16.8 | 21.8 | 18.2 |

[1] polyvinyl acetate (72.5% hydrolyzed)
[2] methoxy cellulose
[3] polyvinyl acetate (55% hydrolyzed)
[4] polyvinyl acetate (88% hydrolyzed)
[5] Wt. % in final product based on total copolymer weight
[6] Wt. % based on total copolymer weight.
*Prepared in a 3L reactor @ 700 RPM

TABLE III

| Example No. | Polyester Type | Resin Composition (% PVC/polyester) | Percent IPA Non-Extractables |
|---|---|---|---|
| 28 | AA/PG/CA | 70.9/29.1 | 43.5 |
| 29 | AA/PG/CA | 65.1/34.9 | 30.1 |
| 30 | AA/PG/CA | 69.3/30.7 | 34.1 |
| 31 | AA/PG/CA | 62.4/37.6 | 52.0 |
| 32 | AA/PG/CA | 65.4/34.6 | 55.2 |
| 33 | AA/PG/CA | 67.8/32.2 | 53.0 |
| 34 | AA/NPG/CA | 68.1/31.9 | 40.6 |
| 35 | AA/PG/CA | 58.8/41.2 | 25.7 |
| 36 | SA/PG/CA | 58.9/41.1 | 80.4 |
| Control | *PLASTHALL 550 glutarate ester | 50.3/49.7 | 4.4 |
| Control | *PLASTHALL P1070 polyester-sebacate | 575/42.5 | 16.8 |

*non-functionalized commercial polyester plasticizers available from the C. P. Hall Company, Chicago, IL.

What is claimed is:

1. An internally-plasticized vinyl halide copolymer composition comprising a copolymerization product of a vinyl halide and a reactive polyester, said vinyl halide being polymerized in the presence of the reactive polyester and wherein the reactive polyester has the formula:

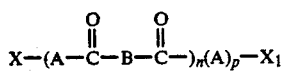

wherein A is a linear or branched polyol residue having from about 2 to about 10 carbon atoms and one oxy group at each of its molecular ends; B is a linear alkylene from about 2 to about 12 carbon atoms, or B is phenylene; and X and $X_1$ independently are selected from the group consisting of hydrogen; an acyl group from a saturated or a monounsaturated monocarboxylic acid having from about 3 to about 18 carbon atoms; and R—C(O)—O—Y, wherein R is a saturated or an unsaturated hydrocarbon including from about 3 to about 18 carbon atoms and Y is a linear alkylene from 1 to about 4 carbon atoms; n is an integer from 1 to 60; and p is 0 or 1; with the proviso that when p is 0, $X_1$ is hydrogen; and that at least one of X and $X_1$ includes ethylenic monounsaturation.

2. The copolymer composition of claim 1, wherein the reactive polyester is present in an amount of up to about 50 parts by weight based on 100 parts by weight of vinyl halide.

3. The copolymer composition of claim 1, wherein the vinyl halide is vinyl chloride.

4. The copolymer composition of claim 1, wherein the vinyl halide is vinyl chloride or vinylidene chloride; or a mixture thereof.

5. The copolymer composition of claim 1, further comprising copolymerizable monomer having at least one terminal $CH_2=C<$ grouping.

6. The copolymer composition of claim 5, wherein the copolymerizable monomer is selected from the group consisting of α,β-olefinically unsaturated carboxylic acids, esters of α,β-olefinically unsaturated carboxylic acids, ethylenically unsaturated dicarboxylic acids, anhydrides of ethylenically unsaturated dicarboxylic acids, esters of ethylenically unsaturated dicarboxylic acids, ethylenically unsaturated nitriles, ethylenically unsaturated amides, vinyl ketones, vinyl ethers, aromatic olefins, and olefinic hydrocarbons; or mixtures thereof.

7. The copolymer composition of claim 5, wherein the copolymerizable monomer is selected from the group consisting of acrylic acid, methacrylic acid, methyl acrylate, ethyl acrylate, octyl acrylate, 2-ethylhexyl acrylate, methyl methacrylate, maleic acid, citraconic acid, maleic anhydride, dibutylfumarate, acrylonitrile, acrylamide, vinyl acetate, ethyl vinyl ether, methyl vinyl ketone, styrene, α-methyl styrene, butadiene, and chloroprene; or mixtures thereof.

8. The copolymer composition of claim 1, wherein the amount of the reactive plasticizer capable of being extracted from the copolymer composition is less than about 75 percent by weight of the reactive plasticizer present in the copolymer composition.

9. The copolymer composition of claim 2, wherein the amount of the reactive plasticizer capable of being extracted from the copolymer composition is less than about 50 percent by weight of the reactive plasticizer present in the copolymer composition.

10. The copolymer composition of claim 1, wherein the amount of the reactive plasticizer capable being extracted from the copolymer composition is less than about 20 percent by weight of the reactive plasticizer present in the copolymer composition.

11. The copolymer composition of claim 1 further comprising from about 1 to about 15 parts by weight based on 100 parts by weight of vinyl halide of an external plasticizer.

12. The copolymer composition of claim 11 wherein the external plasticizer is selected from the group consisting of dioctyl phthalate, epoxidized soybean oil, epoxidized linseed oil, 2-ethylhexyl epoxytallate, diisodecyl epoxytallate, tricresyl phosphate, tri-2-ethylhexyl phosphate, octyl diphenyl phosphate, tetrahydro-4,5-epoxyphthalate, dicapryl phthalate, di-2-ethylhexyl phthalate, di-n-butyl phthalate, ditridecyl phthalate, and butyl benzyl phthalate; or mixtures thereof.

13. An internally plasticized vinyl chloride copolymer composition comprising a copolymerization product of vinyl chloride and up to about 50 parts by weight based on 100 parts by weight vinyl chloride of a reactive polyester, said vinyl chloride being polymerized in the presence of the reactive polyester, said reactive polyester having the formula:

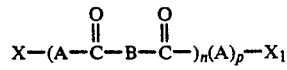

wherein A is a linear or branched polyol residue having from about 2 to about 10 carbon atoms and one oxy group at its molecular ends; B is a linear alkylene from about 2 to about 12 carbon atoms, or B is phenylene; and X and $X_1$ independently are selected from the group consisting of hydrogen; and acyl group from a saturated or a monounsaturated monocarboxylic acid having from about 3 to about 18 carbon atoms; and R—C(O)—O—Y, wherein R is a saturated or an unsaturated hydrocarbon including from about 3 to about 18 carbon atoms and Y is a linear alkylene from 1 to about 4 carbon atoms; n is an integer from 1 to 60; and p is 0 to 1; with the proviso that when p is 0, $X_1$ is hydrogen, and that at least one of X and $X_1$ includes ethylenic monosaturation.

* * * * *